A. COLE, JR 3,620,069
METHOD AND APPARATUS FOR MEASURING THE
DAMPING CHARACTERISTICS OF A STRUCTURE
Filed Jan. 24, 1969
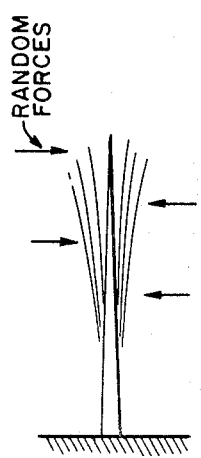
Fig_1
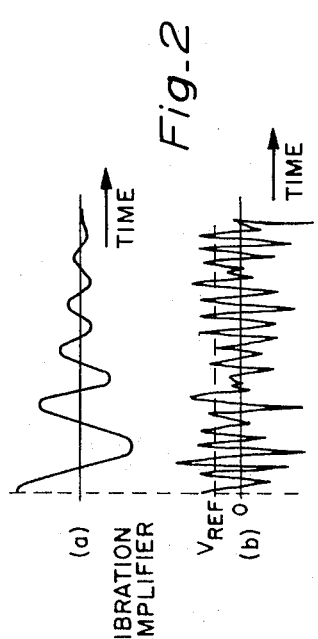
Fig_2
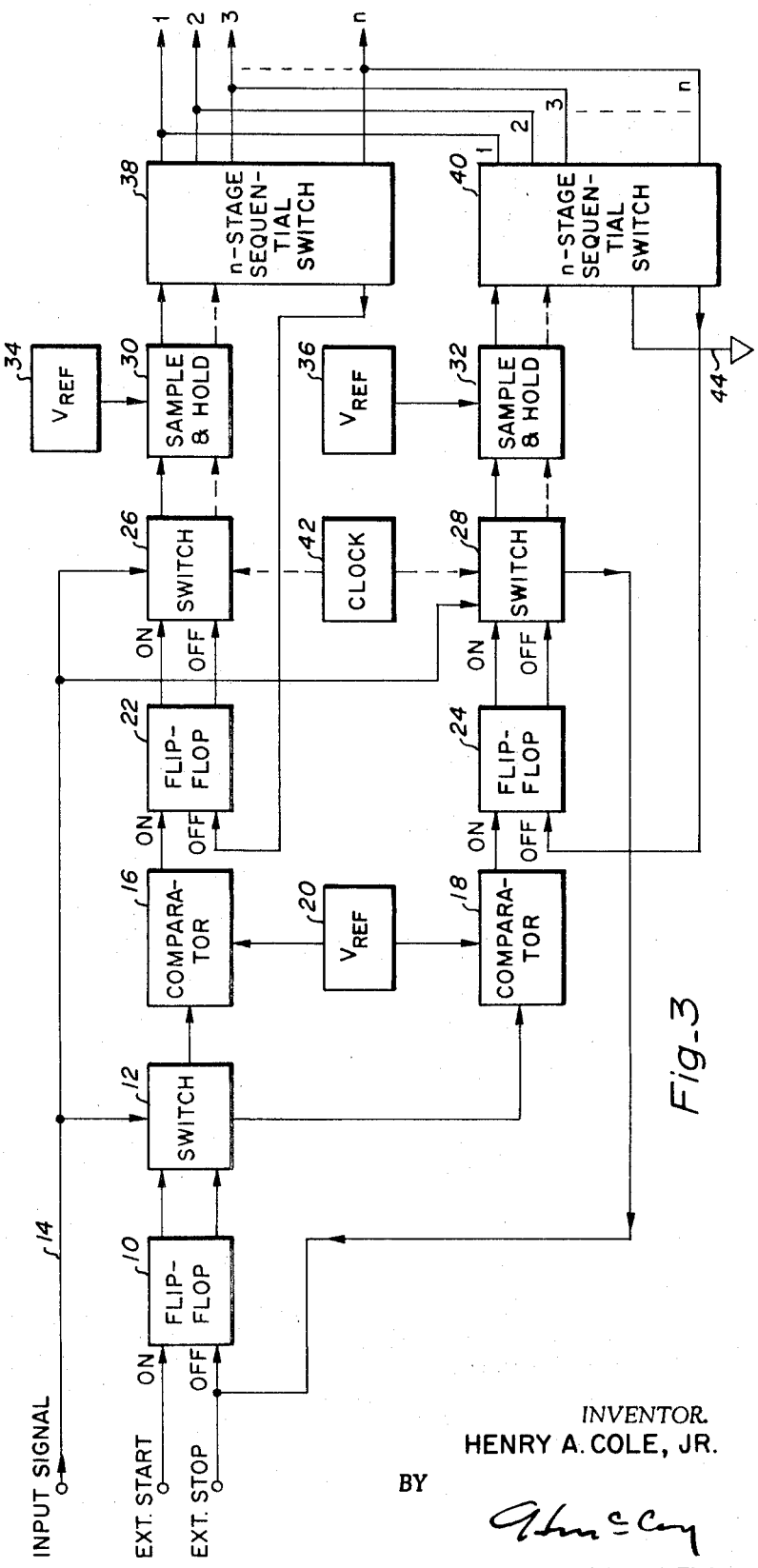
Fig_3
INVENTOR.
HENRY A. COLE, JR.
BY
ATTORNEYS

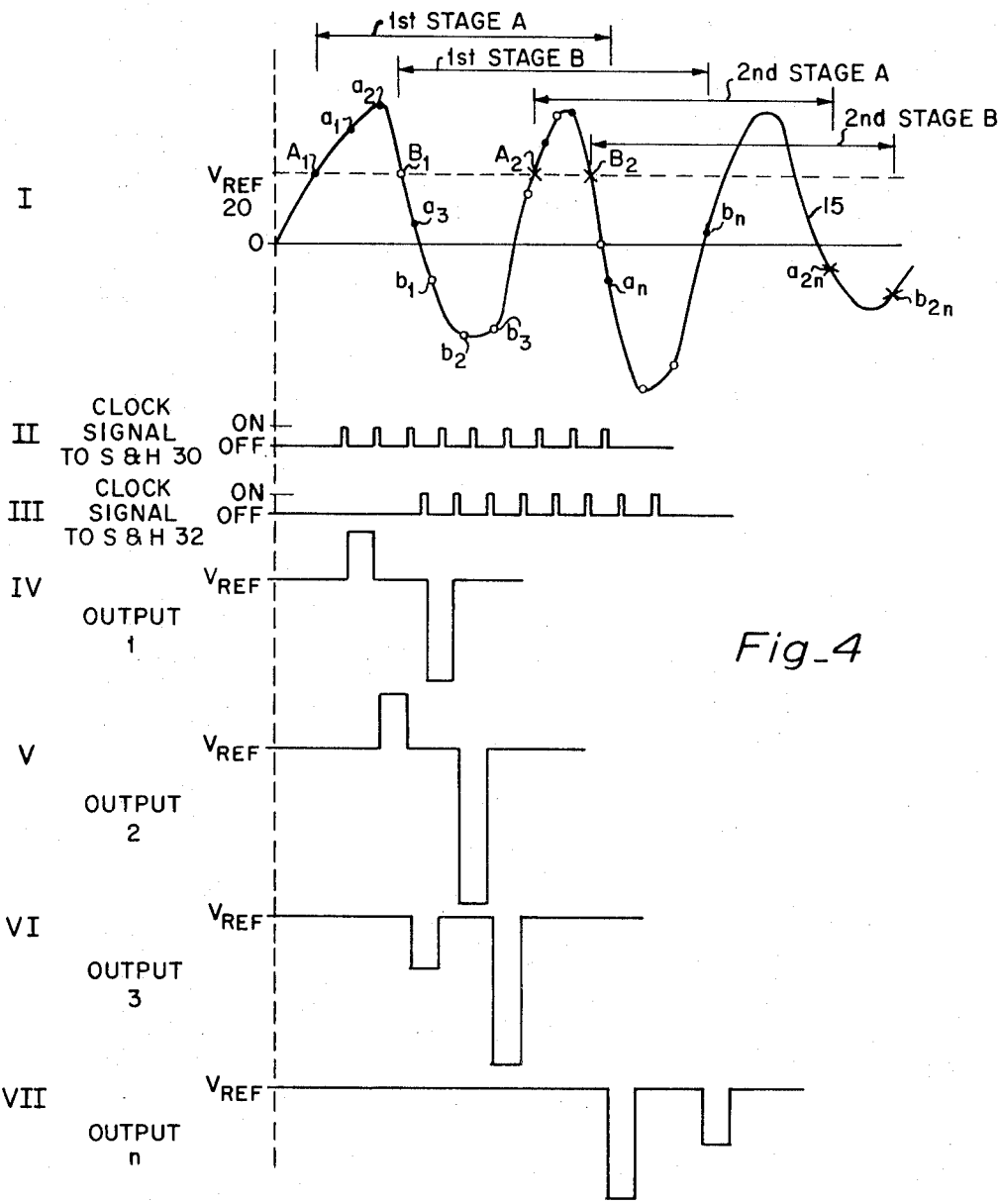
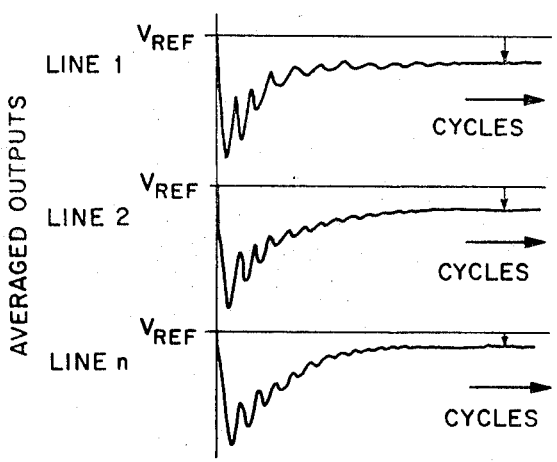
Fig_4
Fig_5

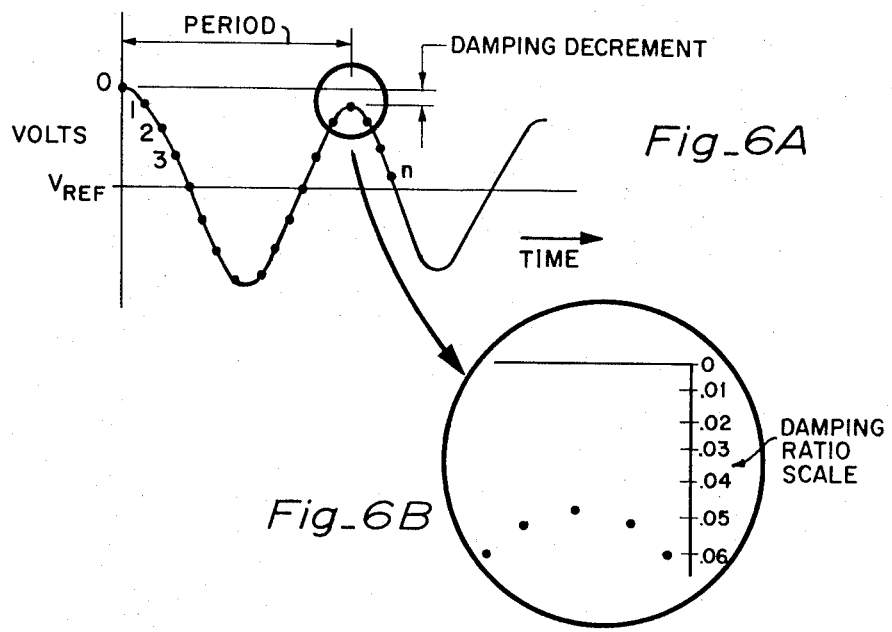
Fig_6A
Fig_6B
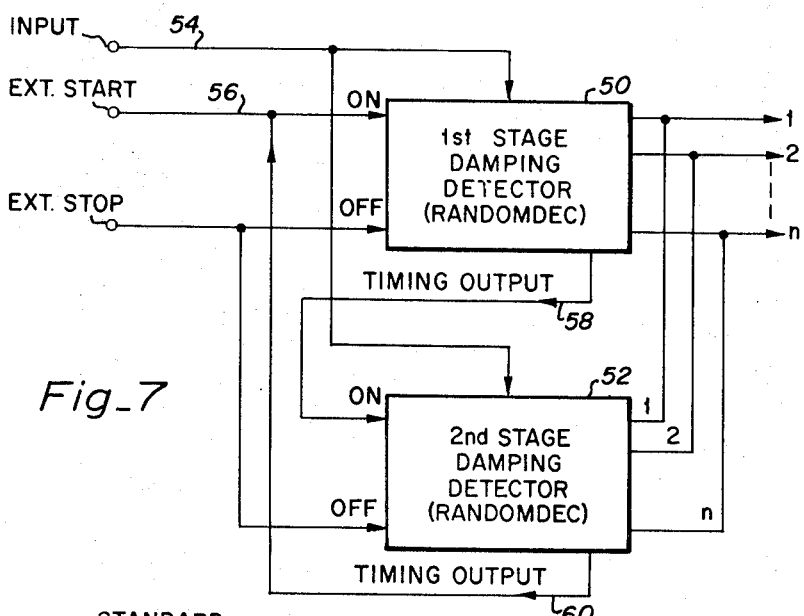
Fig_7
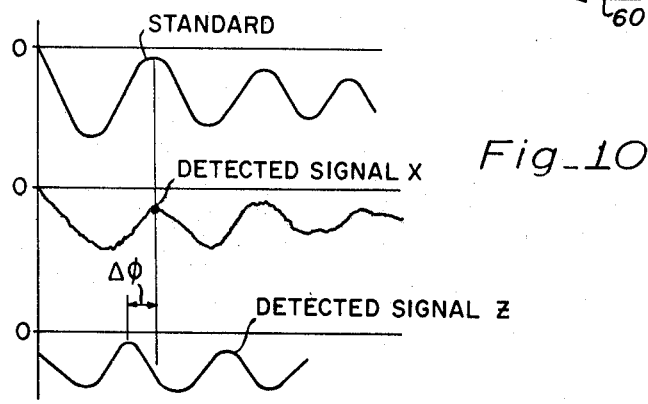
Fig_10
INVENTOR.
HENRY A. COLE, JR.

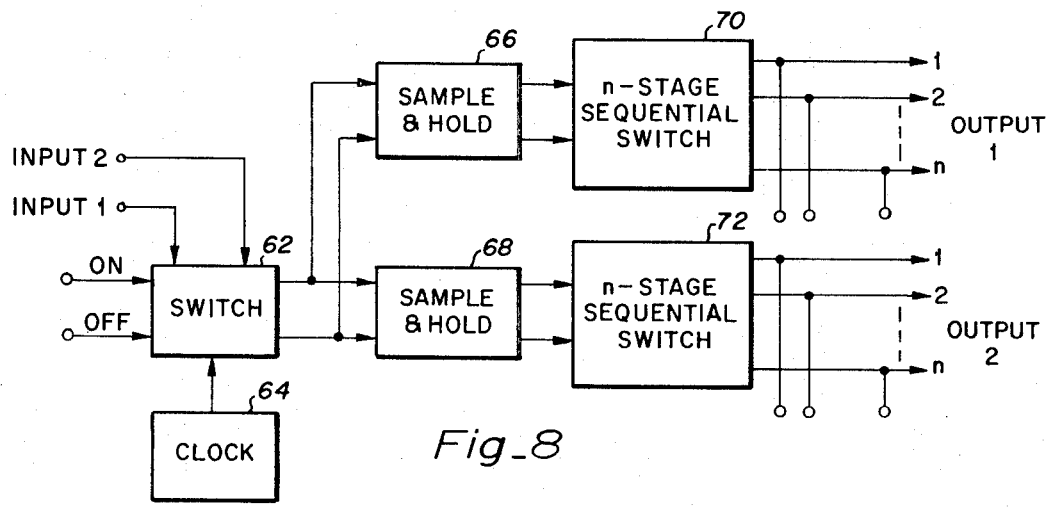
Fig_8
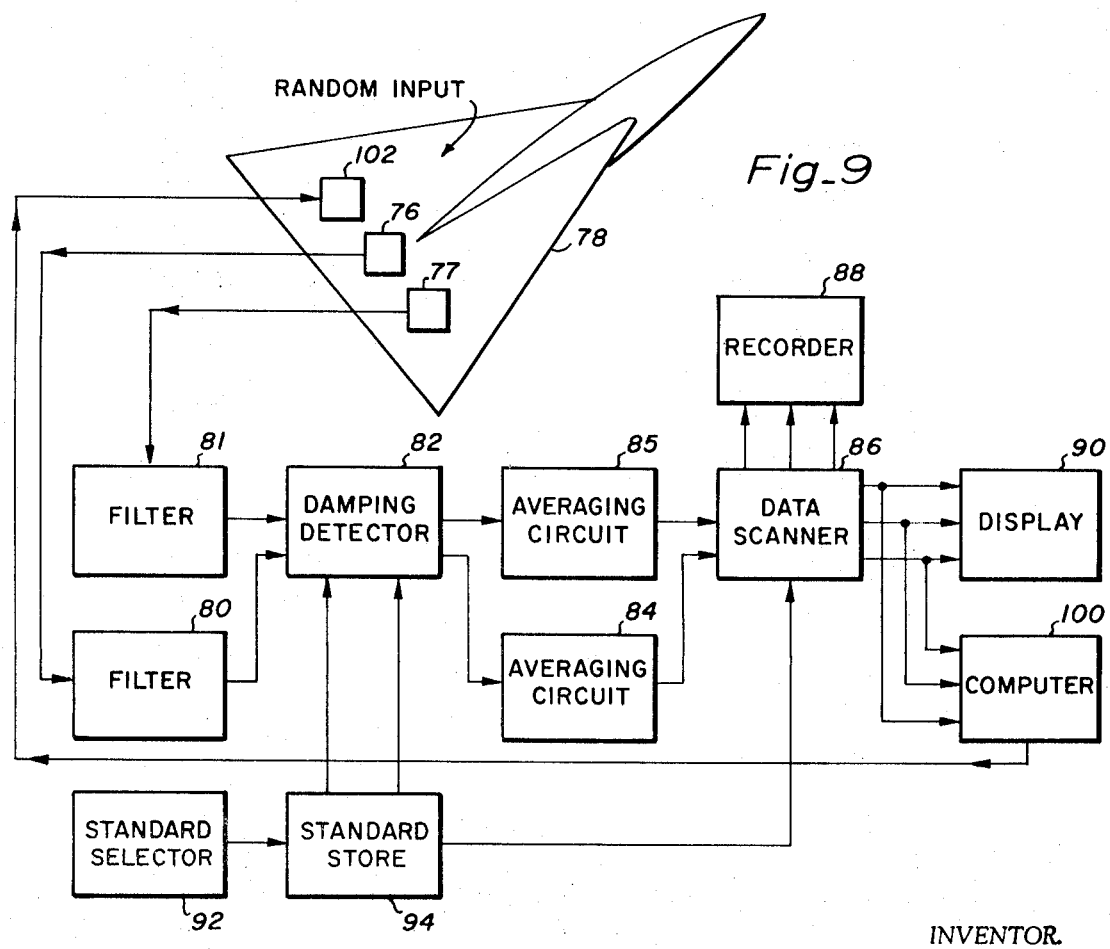
Fig_9

United States Patent Office 3,620,069
Patented Nov. 16, 1971

3,620,069
METHOD AND APPARATUS FOR MEASURING THE DAMPING CHARACTERISTICS OF A STRUCTURE
Henry A. Cole, Jr., Los Altos, Calif., assignor to the United States of America as represented by the Administrator of the National Aeronautics and Space Administration
Filed Jan. 24, 1969, Ser. No. 793,771
Int. Cl. G01h 1/00; G01l 19/00
U.S. Cl. 73—67.2                    10 Claims

ABSTRACT OF THE DISCLOSURE

Apparatus for measuring the damping characteristics of a structure or system during excitation by random forces or influences. The "RANDOMDEC" apparatus is comprised of at least two parallel sampling circuits which perform time sequential sampling operations on predetermined portions of a given input signal. The corresponding outputs of each sampling circuit are then added together at a plurality of output terminals. From each output terminal a sampling transient indicative of a point on the damping characteristic of the structure can be obtained. In accordance with the invention, a system is also disclosed utilizing this apparatus to provide an on-the-line damping ratio and period detection and display apparatus including means for instantaneously observing the damping characteristics of the monitored structure and providing an output control signal which can be used to influence the characteristics of the structure or the forces applied thereto in a selected manner.

BACKGROUND OF THE INVENTION

When physical structures are subjected to random forces, certain internal vibrations are set up within the structure as it attempts to absorb the energy imparted to it. In some cases, the energy imparted thereto may exceed the physical limitations of the structure and initiate a fatiguing action which will result in failure of the structure. Optimally, physical structures which are designed to be subjected to certain types of stresses and strains are provided with suitable reinforcement in those areas which are found to be susceptible to failure due to internal vibrations induced therein. However, in most cases these failures are detected only by the use of a cut-and-try process which usually results in the destruction of the sample structure being tested.

Various attempts have thus been made in the prior art to provide means for obtaining data which would be used to either aid in the design of failsafe structures or which could be used as an on-the-line monitoring apparatus for initiating such action as is required to cancel or reduce the applied forces which may cause injury to the structure. Although the prior art is replete with the various types of apparatus for measuring structural responses to random vibrations, the data obtained therefrom is usually so complicated that an observer conducting the test or experiment cannot readily tell when a significant change in the structural response of the test sample occurs.

During the course of wind tunnel experiments on buffeting of dynamic models of launch vehicles, for example, it has become apparent that rational decisions based on the variations of test conditions cannot be made on the basis of observation of the output time history alone. The problem is that the random time histories are typically so complicated that about all the observer can interpret from them is the general level of the signals. The stresses involved in this specific application are particularly critical near flutter regions where the lack of knowledge of trends in damping and frequency could lead to destruction of the model.

In many cases, experiments are run only to find by later analysis that stability boundaries were not adequately defined or that records were not long enough for statistical significance. Also, because of the various uncertainties, many of the records were longer than necessary and hence valuable wind tunnel time was wasted. Whereas spectral analyzers have been developed for on-the-line use, wherein damping data can be obtained by measuring the band width of the half power points, this type of analysis requires too much time to obtain accurate values of damping and gives erroneous answers for nonlinear systems.

Correlation computers have also been developed for on-the-line use, wherein damping data is obtained from the decrement of the autocorrelation function. However, these correlation computers only given the damping at the amplitude of the RMS of the random output. To obtain damping at lower amplitudes too much time is needed and damping at higher amplitudes cannot be obtained. Hence, correlation computers can only be used with linear systems. Furthermore, accuracy of the damping measurement is limited because two large numbers have to be subtracted in order to obtain a small number when damping is small.

Another disadvantage of the prior art is that the damping indicia are not obtained directly as voltages which can be used in a control system.

SUMMARY OF THE PRESENT INVENTION

The present invention relates generally to an automatic on-the-line damping measuring device and more particularly, to an instrument for measuring the damping decrement of a structure or system during excitation by random forces or influences.

The instrument output is suitable for use as a means for determining the safe and satisfactory operating conditions of various types of equipment as well as to detect impending failures therein. In accordance with the present invention, the measurement is made directly during the operation or test period and the output can be used in a suitable control system to automatically correct dangerous or off-standard conditions.

On one particular application, the instrument measures damping decrements of various aircraft components during times when random inputs are present, such as during landing and takeoff roll, flight through turbulence, and normal flight jet and boundary layer conditions. Such random inputs can also be generated artificially by operation of controls with a random generator. The measured damping decrement is compared with a standard decrement on a dual trace oscilloscope by the flight engineer, and deviations from a standard can be interpreted in terms of fatigue failure, degradation of stability augmenters, etc. The measured damping decrement signal can also be used as a control signal in an electrical control system to take instantaneous action in dangerous situations which may occur too fast for human reaction time, such as approach to flutter boundaries or failures in stability augmentation systems, for example. The measured damping decrement can also be stored and used for preventative maintenance.

The apparatus of the present invention can also be used in flutter and buffeting tests of dynamic models in wind tunnels to measure damping and to indicate the record length needed for statistical significance. This information can also be used to save test and analysis time.

In a manufacturing application, the random decrement data obtained by utilization of the present invention can be used as a process control measurement to single out off-standard parts in many types of products, such as airplanes, automobiles, space vehicles, electronic systems, etc.

The random decrement determining apparatus of the present invention can also be used as an indicator of the current condition of structures and systems in use. For example, bridges and buildings excited by wind loads, vehicles excited by road roughness, etc.

As a general laboratory instrument, the present invention can be used to measure damping of nonlinear as well as linear systems. Hence, it can be used on a wide range of samples under simulated or natural random environments. It may also be used as an instrument to classify biological specimens.

One advantage of the present invention is that a damping measurement can be obtained at a fixed amplitude during operation so as to allow it to be used as a process control quantity.

Another advantage of the present invention is that the damping measurement is obtained faster and more accurately than by spectral density methods previously used in the prior art.

Still another advantage of the present invention is that damping data obtained from nonlinear systems is obtained faster than is possible using autocorrelation methods and is not limited to a specific amplitude. Autocorrelation functions start at the level of the mean square value, whereas the data obtained in accordance with the present invention start at any selected voltage level.

Still another advantage of the present invention is that the effects of nonstationary inputs are automatically compensated for.

Still another advantage of the present invention is that fewer components are needed, thus making it more reliable and less expensive as well as simpler to operate and maintain. Furthermore, multiplication and time delay circuits needed in correlation methods are eliminated.

Still another advantage of the present invention is that the resolution of the damping signal is greatly increased because the damping decrement is measured directly from the reference level rather than by subtracting a large number from a large number to get a small number, as is typically the case using the autocorrelation technique.

It is therefore a principal object of the present invention to provide an automatic on-the-line damping measurement device for measuring the damping decrement of a structure or system during excitation by random forces or inputs.

Another object of the present invention is to provide an automatic on-the-line damping measuring device, the output of which may be used to determine the safe and satisfactory operating conditions of various types of structures and to detect impending failure thereof.

Still other objects and advantages of the present invention will become apparent after a reading of the following detailed description of the preferred embodiments which refer to the several figures of the drawing.

In the drawing:

FIG. 1 is a simple illustration of a structure being caused to vibrate in response to random forces supplied thereto.

FIG. 2 is a diagram illustrating the vibratory conditions set up in a given structure in response to forces applied thereto.

FIG. 3 is a block diagram of an on-the-line damping measuring device in accordance with the present invention.

FIG. 4 is a timing diagram illustrating the operation of the present invention as disclosed with regard to FIG. 3.

FIG. 5 illustrates a series of transient curves obtained in response to the outputs of the system described in FIG. 3.

FIG. 6A illustrates the damping data obtained by scanning the averaged outputs of the apparatus of FIG. 3, and FIG. 6B illustrates a portion of the damping data as presented on a CRT display calibrated to show damping ratio.

FIG. 7 illustrates a two-stage damping detection apparatus in accordance with the present invention.

FIG. 8 illustrates a multiple-input modification of the present invention.

FIG. 9 is a schematic diagram of a damping detection and control system in accordance with the present invention.

FIG. 10 illustrates an exemplary output displayed by the system of FIG. 9.

DESCRIPTION OF THE PREFERRED EMBODIMENTS

When a mechanical structure such as is illustrated generally in FIG. 1 is subjected to random forces, vibrations are set up therein which are damped in accordance with the mechanical characteristics of the particular structure. By attaching a suitable vibration sensing transducer to the structure shown in FIG. 1 when it is subjected to random forces, a vibrational signal can be detected therefrom which will be on the order of that illustrated in FIG. 2(b) of the drawing. The curve in this figure illustrates the vibratory oscillations of the structure in response to the random forces applied.

If a single force were to be applied to the structure, and then it were allowed to vibrate unrestrained in response to that single force, the damping characteristics of the structure would cause the vibrational action of the structure to decay exponentially as illustrated in FIG. 2(a). However, where the forces applied to the structure are random and continuous, the vibrational deflections of the structure will not be allowed to go to zero and the structure will continue to vibrate at an irregular frequency which is determined by the sum of the random forces and the damping characteristics of the structure.

By measuring the effect of the vibrations induced in the structure by the random forces the damping characteristics of the structure can be obtained using on-the-line measuring apparatus such as is provided by the present invention. Using this apparatus much valuable information can be obtained regarding the mechanical characteristics of a particular structure.

Turning now to FIG. 3 of the drawing, there is shown an automatic on-the-line damping measuring device in accordance with the present invention. The device includes a start-stop flip-flop 10 which controls a switch 12 for connecting the input signal on line 14 to a first comparator 16 and a second comparator 18. A voltage reference source 20 is provided for supplying a reference voltage to both of the comparators 16 and 18. A pair of flip-flops 22 and 24 are connected to the output of comparators 16 and 18 respectively for controlling the switches 26 and 28 which couple the input signal on line 14 to the sample-and-hold circuits 30 and 32 respectively. Suitable voltage reference source means 34 and 36 from voltage reference 20 are provided for supplying reference voltages to the sample-and-hold circuits 30 and 32 respectively.

Connected to the output of the sample-and-hold circuits 30 and 32 are a pair of $n$-stage sequential switches 38 and 40 respectively, which channel the sample voltages into a plurality of output lines 1, 2, 3 . . . $n$. The switches 26 and 28, sample-and-hold circuits 30 and 32, and the $n$-stage sequential switches 38 and 40 are all controlled by a clock means 42, which synchronizes the various components and initiates the sequential stepping action of the switches 38 and 40. The output 1, 2, 3 . . . $n$ of sequential switch 40 are coupled to the like outputs of the sequential switch 38.

Referring additionally to FIG. 4 of the drawing, the operation of the damping measuring device of FIG. 3 will be explained. The upper curve shown in FIG. 4 is an exploded view of the first three oscillations of detected vibrations of the type illustrated in FIG. 2(b) of the drawing. The voltage $V_{ref}$ of the voltage reference supply 20 is set at an appropriate level of the input signal appearing on line 14. The clock rate of the clock 42 is then chosen to provide for the taking of an appropriate number of samples from the given input. The external start button is then actuated causing flip-flop 10 to turn on switch 12 and allow the input signal at 14 to be conducted to the comparators 16 and 18.

The comparator 16 is set to provide an output signal when the voltage of the signal input thereto reaches the reference voltage $V_{ref}$ in a positive going direction. When point $A_1$ on the curve 15 is reached, the flip-flop 22 causes switch 26 to be turned on so ts to couple the input signal 15 appearing on line 14 to the sample-and-hold circuit 30. The output of the clock 42 is also connected to the sample-and-hold circuit 30 as the switch 26 is opened so as to cause the circuit 30 to produce a stepped output voltage which changes with each clock pulse in response to the instantaneous value of the input signal 15.

In part II of FIG. 4 the clock signal input to sample-and-hold circuit 30 is illustrated and corresponds to the points $a_1, a_2 \ldots a_n$ on curve 15 of part I of FIG. 4. The clock pulses passing through the sample-and-hold circuit 30 also cause the sequential switch 38 to change output lines with voltage signal produced by the circuit 30. Thus, the output on line 1 in response to the input signal passing through switch 26 will correspond to the first pulse indicated in part IV of FIG. 4. The second sample voltage, corresponding to the voltage at $a_2$, will be connected to output 2 of sequential switch 38 and appear as the first positive pulse shown in part V of FIG. 4.

Likewise, the output voltage applied to output 3 of sequential switch 38 will correspond to the first pulse shown in part VI of FIG. 4 and the voltage corresponding to point $a_n$, which appears at the $n^{th}$ output of switch 38 will correspond to that illustrated by the first pulse in part VII of FIG. 4. The number of samples $n$, which are taken for a given input signal is generally chosen so as to overlap at least two positive nodes of the input signal.

The comparator 18 is set so that it provides an output signal when the input signal 15 crosses the reference voltage going negative as shown at point $B_1$ in part I of FIG. 4. At point $B_1$ the flip-flop 24 causes switch 28 to couple the input signal 15 on line 14 to the sample-and-hold circuit 32, which is likewise controlled by clock 42 and outputs are provided for lines 1, 2, 3 . . . $n$ of sequential switch 40 corresponding to the points $b_1, b_2 \ldots b_n$ in the manner explained above with respect to the output of switch 38. The turning on of the switch 28 also sends an off signal to flip-flop 10 which turns off switch 12.

The outputs of switch 40 are coupled directly to the corresponding outputs of the switch 38 so that the complete outputs on lines 1, 2, 3 . . . $n$ include two pulses, the first of which corresponds to the output of the "A" stage and the second of which corresponds to the "B" stage output as illustrated in parts IV, V, VI, and VII of FIG. 4.

As each of the switches 38 and 40 reach the $n^{th}$ output an OFF signal is generated and applied to flip-flops 22 and 24 respectively for turning OFF the switches 26 and 28 respectively. Shortly after the switch 40 begins its stepping procedure an output 44 is generated, which may be fed back to the external start of flip-flop 10 for single-stage operation or may be fed to a second stage for initating two-stage operation as will be explained more fully with reference to FIG. 7 of the drawing.

For purposes of brevity, the circuit of FIG. 3 will be referred to as the "RANDOMDEC" device. The respective outputs of the RANDOMDEC may be read in several ways. For example, an analog averaging circuit may be used so as to average the outputs of each line and obtain approximate values of period and damping decrement as shown in FIGS. 5 and 6. The curves shown in FIG. 5 represent the typical voltage transients of a RANDOMDEC output after passing through an averaging circuit. By scanning these output and displaying them in time sequence on a CRT as shown in FIG. 6 of the drawing both the period and damping decrement of the structure being tested can readily be determined.

The points 1, 2, 3 . . . $n$ of FIG. 6A correspond to a sampling of the outputs 1, 2, 3 . . . $n$ taken from the RANDOMDEC of FIG. 3 after they have been averaged to produce the stabilized output signals shown in FIG. 5. By appropriately calibrating the CRT display, the damping decrement can be very accurately obtained in the manner illustrated in FIG. 6B of the drawing, which limits the portion of the sample being viewed to that encircled in FIG. 6A coresponding to the second node of the total output signal. By providing a suitable scale the damping ratio may be read directly in place of damping decrement.

Referring now to FIG. 7 of the drawing, a two stage RANDOMDEC apparatus is illustrated. In this embodiment which includes a first RANDOMDEC 50 and a second RANDOMDEC 52 of the type described in detail with reference to FIG. 3. The outputs thereof are commonly connected to a set of output terminals 1, 2, 3 . . . $n$. The input signal applied to input terminal 54 is directly connected to the input of both detectors 50 and 52. When the first stage 50 is started by an external start signal applied at 56, the first stage will be actuated to provide a series of pulses as described above.

At some predetermined time after the first stage 50 has been energized, a timing output signal 58 will be produced by first stage 50 for turning on second stage 52, which provides another set of pulses corresponding to later portions of the curve 15 illustrated in part I of FIG.4. The timing output 60 of the second stage feeds back to the first stage so that it will operate on the next peak. In this manner, all of the peaks are included in the calculaitons.

Ordinarily, only two such stages are needed to obtain the random decrement because the stage operation time needed is only slightly longer than one period. In some laboratory applications it may be desirable to look at more than one period of the decrement, in which case any number of stages may likewise be added to insure that all peaks are included.

In FIG. 8 of the drawing, a multiple channelled input embodiment is illustrated which could be used to monitor many different conditions simultaneously. In this embodiment exemplary inputs 1 and 2 are connected through a 2-pole switch means 62, which is controlled by a clock 64 and on-off signals from flip-flop 22, FIG. 3, to sample-and hold circuits 66 and 68 respectively. As described with reference to the above circuits, the output of the sample-and-hold circuits 66 and 68 are fed into $n$-stage sequential switching means 70 and 72, which provide a plurality of ouptuts 1, 2, 3 . . . $n$ for each input 1 and 2. These may be simultaneously displayed in any suitable manner. If the comparator is a human operator, it may be expedient to have a red light board along with a switching means for switching a CRT display to critical locations for viewing. Multiple channels may also be used in critical cases to check the reliability of the measurement obtained. The multiple channel application gives the phase angle between the inputs as well as the damping and period. This application of the invention is analogous to cross correlation of two signals but has the same advantages as does the RANDOMDEC process over auto-correlation.

In FIG. 9 of the drawing, a complete system is illustrated in block diagram form. The input to the system, however, is limited to two transducers for purposes of simplicity of explanation. It is to be understood, however, that any number of transducers may be utilized in any suitable manner. The sending transducers 76 and 77 are appropriately positioned so as to detect vibrations in critical points of the structure of aircraft 78. The structure 78 could, of course, be any portion of any type of system or manufacturing process subjected to a random input, either natural or artificial. The transducers 76 and 77 may be strain gauges, accelerometers, or any other suitable devices designed to measure the controlled quantity.

The output of the transducers 76 and 77 are fed to filters 80 and 81 respectively which band-limit the signals to the range of interest. These signals are then fed to the RANDOMDEC damping detector 82, which measures the on-the-line decrement of the respective random input signals. A data scanner 86 is provided for scanning the various outputs of the averaging circuits 84 and 85 and providing the desired information to a recorder 88 as well as a visual display apparatus 90, where it is desired to compare the on-the-line output to a pre-recorded standard.

A standard selector 92 is provided for selecting a particular standard from a store 94 which feeds the appropriate voltage reference and clock setting to the detector 82. The output of the standard is then fed into the data scanner 86 and is displayed on either or both the recorder 88 and 90 simultaneously so as to provide an immediate indication of any deviation of the input signals received from that of the selected standard.

As was indicated with reference to FIG. 6, only the output of the average period of the signal is needed for comparison of damping. Adjacent outputs would ordinarily be measured to detect changes in period which may also be used in a control system. For failures other than stability, i.e., fatigue, loose connections, etc., it may be desirable to view all of the outputs in order to match the entire RANDOMDEC signature with a standard signature.

By utilizing a computer 100, which is responsive to the display 90, the measured signal and standard can be compared. If voltages fall outside the safe predetermined limits, a signal can be sent back to one or more servos 102 for taking appropriate corrective action. For example, a signal indicating loss of stability could be used to activate a servo for the reducing of power to one or more engines or switching on a standby system or for controlling one or more control surfaces.

In operation of such a control system, RANDOMDEC calculation would be automatically recycled after a predetermined number of peaks were processed. This could easily be done by installing a counter which would operate the external stop after a predetermined number of counts had been made.

In FIG. 10 of the drawing, an example of the utility of the system of FIG. 9 is illustrated. In this example, a standard is shown displayed simultaneously with a detected signal X which has been received at the time the subject structure has begun to fail and a second detected signal Z which is shifted in phase with respect to the standard. The erratic departure of the detected signal X from the standard would quite clearly indicate the structural failure in the monitored apparatus while the phase shift $\Delta\phi$ of the second signal would indicate other deviations. This, of course, is another area of utility of the present invention beyond that of simply determining the damping decrement of a given structure.

After having read the above disclosure, it is contemplated that many alterations and modifications of the system will become apparent to those of skill in the art. For example, the sample-and-hold circuits could be eliminated from the circuit of FIG. 3 at some sacrifice in precision. Similarly, the clock could be a continuously running clock which is simply switched on rather than started at some sacrifice in timing position. The averaging circuit in its simplest form may be a potentiometer. Furthermore, the operation of the RANDOMDEC could be accomplished by equivalent circuits utilizing fluidic components or digital computation in place of the sample-and-hold circuits.

In addition, parallel RANDOMDEC systems may be used to determine damping at many different levels simultaneously by staggering the reference voltage levels of each RANDOMDEC unit. The precision of the RANDOMDEC could, of course, be further improved by storing the outputs from the sequential switch 38 and synchronizing them with the outputs of the sequential switch 40. This would have the effect of narrowing the variance of the values about the average. For linear and nonlinear systems, which are symmetrical about 0, the speed of operation can be doubled by adding stages which operate at the negative of the reference voltage measured from the means value. This can also be done by rectifying the signal and doubling the number of stages at the positive reference level.

Furthermore, additional accuracy can be achieved by adding an "AND" logic unit to the external start, and a comparator which is ON when the input voltage is less than the reference voltage. Without this, however, the system will start at $B_1$, if the voltage happens to be above the reference level when the external start is turned ON. This can also be prevented by putting a flip-flop and switch between switch 12 and comparator 18 which is turned ON by the timing signal from switch 26 and OFF of by the timing signal from switch 28.

In view of the many possible alterations and modifications which will become apparent after having read the foregoing description, it is to be understood that this description is for purposes of illustration only and is in no manner intended to be limiting in any way. Whereas the following claims are directed to methods and apparatus for determining the damping characteristics of an oscillatory signal it is intended that the term damping characteristics be interpreted to at least include measurements of damping decrement, period, phase angle and signature of the input or detected signal as well as the differences between these characteristics of the input or detected signal and those of a given standard. Further, I intend that the appended claims be interpreted as covering all modifications which fall within the true spirit and scope of my invention.

What is claimed is:

1. Apparatus for real time measurement of the damping characteristics of a member subjected to random forces comprising:
   means for generating an input signal representative of the vibratory motion of said member;
   a reference voltage source;
   means coupled to said generating means and said source for cyclically sampling and holding portions of said input signal for a predetermined time beginning when said input signal exceeds said reference voltage, said portions being in the form of pulses;
   means coupled to said generating means and said source for cyclically sampling and holding portions of said input signal for a predetermined time beginning when said input signal drops below said reference voltage, said portions being in the form of pulses;
   means coupled to both of said sampling and holding means for sequentially and repetitively switching said pulses to $n$ separate channels;
   means coupled to said switching means for averaging said pulses in each channel; and
   means coupled to said averaging means for sequentially scanning said averaged pulses and displaying them in time sequence.

2. Apparatus for the real time measurement of the phase relationship between first and second points on a vibrating structure subject to random forces comprising:
   first means for generating a waveform representative of the free vibration curve of said structure at said first point even when said structure is subjected to a random force, said first means including a vibration transducer located on said vibrating structure at said first point;

second means for generating a waveform representative of the free vibration curve of said structure at said second point even when said structure is subjected to a random force, said second means including a vibration transducer located on said vibrating structure at said second point; and means coupled to both of said generating means for simultaneously displaying both of said waveforms with a common time base.

3. Safety apparatus for a structure vibrating from random forces comprising:

means for generating a waveform representative of the free vibration curve of said structure even when said structure is subjected to a random force, said means including a vibration transducer located on said vibrating structure;

storage means for containing a waveform representative of the standard free vibration curve of said structure;

means coupled to said generating means and said storage means for comparing said generated waveform with said stored waveform; and means coupled to said structure and said comparing means for changing the loading on said structure when said waveforms are different.

4. Apparatus for the real time observation of the damping characteristics of a structure subjected to random forces comprising:

means for generating an input signal representative of the vibrational motion of said structure;

a reference voltage source;

first means coupled to said generating means and said source for periodically sampling and holding pulse-shaped samples of said input signal for a predetermined period starting when said input signal exceeds said reference voltage;

means coupled to said generating means and said source for periodically sampling and holding pulse-shaped samples of said input signal for a predetermined period starting when said input signal drops below said reference voltage;

means coupled to both of said sampling and holding means for sequentially and repetitively switching said pulses to n separate channels;

means coupled to said switching means for averaging the samples in each channel;

means coupled to said averaging means for sequentially scanning said averaged samples and producing a waveform representative of the real time damping curve of said structure;

storing means for storing a waveform representative of the standard damping curve of said structure; and means coupled ot said scanning means and said storage means for displaying said real time waveform and said standard waveform.

5. Safety apparatus for a structure subjected to random forces comprising:

means for generating an input signal representative of the vibrational motion of said structure;

a reference voltage source;

first means coupled to said generating means and said source for cyclically sampling and holding segments of said input signal for a predetermined period starting when said input signal exceeds said reference voltage, said segments comprising pulses;

means coupled to said generating means and said source for cyclically sampling and holding segments of said input signal for a predetermined period starting when said input signal drops below said reference voltage, said segments comprising pulses;

means coupled to both of said sampling and holding means for sequentially and repetitively switching said pulses to n separate channels;

means coupled to said switching means for averaging said pulses in each channel;

means coupled to said averaging means for sequentially scanning said averaged pulses and producing a waveform representative of the real time damping curve of said structure;

a standard store containing a waveform representing the normal damping curve of said structure;

means coupled to said scanning means and to said store for comparing said real time waveform with said stored waveform; and means coupled to said structure and said comparing means for changing the loading on said structure when said waveforms are different.

6. Apparatus for on-the-line measurement of the damping characteristics of a structure during excitation by random forces comprising:

means for generating an input signal representative of the vibrational motion of said structure;

a reference voltage source;

first and second damping detector stages each including, means coupled to said generating means and said source for periodically sampling and holding pulse-shaped portions of said input signal for a predetermined time beginning when said input signal exceeds said reference voltage, means coupled to said generating means and said cource for periodically sampling and holding pulse-shaped portions of said input signal for a predetermined time beginning when said input signal drops below said reference voltage, means coupled to both of said sampling and holding means for sequentially switching said signal portions to n separate channels;

the numerically corresponding channels of both of said stages being commonly connected;

switching means for alternately energizing said first and second stages;

means coupled to said n channels for averaging said signal portions in each channel; and means coupled to said averaging means for sequentially scanning said averaged signal portions and displaying them in time sequence.

7. A method for the real time measurement of the phase relationship between first and second locations on a vibrating structure subjected to random forces comprising:

generating a first signal representative of the random vibration of said structure at said first location;

using said first signal, generating a waveform representative of the free vibration curve of said structure at said first location even when structure is subjected to a random force;

generating a second signal representative of the random vibration of said structure at said second location;

using said second signal, generating a waveform representative of the free vibration curve of said structure at said second location even when said structure is subjected to a random force; and displaying both of said waveforms on a common time base.

8. A method for real time measurement of the damping characteristics of a member subjected to a random vibrational environment comprising:

generating an input signal representative of the vibrational motion of said member;

generating a reference voltage;

periodically sampling and holding pulse-shaped segments of said input signal for a predetermined period starting when said input signal exceeds said reference voltage;

periodically sampling and holding pulse-shaped segments of said input signal for a predetermined period starting when said input signal drops below said reference voltage;

sequentially and repetitively switching said segments to n separate channels;

averaging said signal segments in each channel; and
sequentially scanning said averaged segments and displaying them in time sequence.

9. A method for the real time measurement of the period of a structure exposed to a random vibrational environment comprising:
generating an input signal representative of the vibrational motion of said member;
generating a reference voltage;
periodically sampling and holding pulse-shaped segments of said input signal for a predetermined time beginning when said input signal exceeds said reference voltage;
periodically sampling and holding pulse-shaped segments of said input signal for a predetermined time beginning when said input signal drops below said reference voltage;
sequentially and repetitively switching said segments to $n$ separate channels;
averaging said segments in each channel;
sequentially scanning said average segments and displaying them in time sequence so as to form a free vibration curve; and
measuring the time displacement between the origin of said curve and the first positive-going peak.

10. A method for protecting a vibrating structure during excitation by random forces comprising:
generating a signal representative of the random vibration of said structure;
using said signal, generating a waveform representative of the free vibration curve of said structure even when said structure is subjected to a random force;
storing a waveform representative of the normal free vibration curve of said structure;
comparing said generated waveform with said stored waveform; and
changing the loading on said structure when said waveforms are different.

References Cited

UNITED STATES PATENTS

| | | | |
|---|---|---|---|
| 2,305,268 | 12/1942 | Minor | 73—71.2 X |
| 2,564,300 | 8/1951 | Culver | 73—71.4 |
| 2,779,869 | 1/1957 | Gerks | 324—77 |
| 3,197,700 | 7/1965 | Schwartz | 324—77 |
| 3,334,298 | 8/1967 | Monrad-Krohn | 328—135 |
| 3,484,689 | 12/1969 | Kerns | 328—151 |
| 3,488,597 | 1/1970 | Schlein | 328—135 |
| 3,019,387 | 1/1962 | Rowe | 73—67.2 X |

RICHARD C. QUEISSER, Primary Examiner

C. E. SNEE III, Assistant Examiner

U.S. Cl. X.R.

324—77 A; 328—135, 151